Dec. 1, 1942.        G. L. JONES        2,303,557
RAIL FLASH WELDER
Filed Aug. 19, 1941
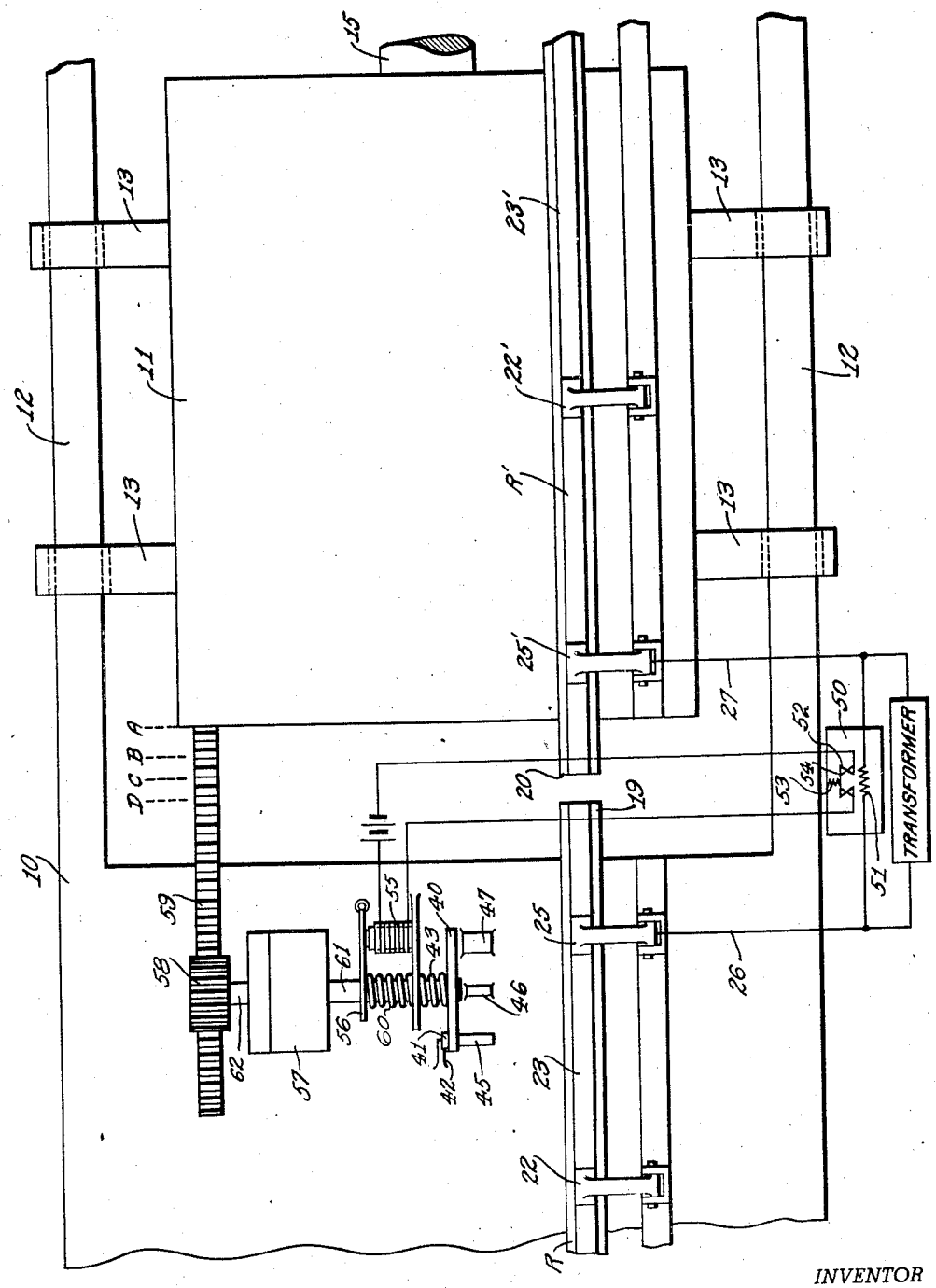
INVENTOR
GEORGE LESTER JONES
BY Joseph H. Lipschutz
ATTORNEY Patented Dec. 1, 1942

2,303,557

UNITED STATES PATENT OFFICE 2,303,557

RAIL FLASH WELDER

George Lester Jones, Garden City, N. Y., assignor to Sperry Products, Inc., Hoboken, N. J., a corporation of New York Application August 19, 1941, Serial No. 407,392

3 Claims. (Cl. 219—4)

This invention relates to welding machines and, particularly, to machines of the type adapted to weld heavy objects, such as rails. In such machines, the weld is formed by clamping the leading rail to the fixed part of the machine, and clamping the following rail to the moving platen. The platen is then moved at a predetermined low speed until the ends of the adjacent rails engage and for a predetermined distance thereafter, that is, until a certain amount of rail has been burned off. At this point, the speed of the platen is increased to cause burn-off at a higher rate and finally there is a further sudden increase in the speed of movement of the platen for the push-up. The first increase in speed, as well as the final increase or push-up, is determined by means of limit switches on the fixed part of the machine with which the moving platen is adapted to engage as it travels toward the fixed rail.

When the weld has been completed, the platen is withdrawn, and the string of welded rail is drawn out of the machine until the rear end of the last rail is in welding position. Then the next rail is run in across the platen until it is near the rear end of the welded string. Because of the inertia of the rail moving into the welding machine, it is not possible always to stop the new rail in the same predetermined position with respect to the platen. As stated above, when the platen begins to move forward at its first speed, it moves a predetermined distance until it engages the limit switch for the first increased speed. It will be seen that part of this predetermined distance consists in bringing the rails in contact, and that the remaining part of this distance consists in the heating up and burning off of the rail ends which are now in flashing engagement. The total distance moved by the platen until it engages the first increased speed limit switch is constant, and, therefore, it will be seen that unless the leading end of the new rail is in the same constant initial position with respect to the platen every time, and unless the rear end of the preceding rail is in the same constant initial position with respect to the fixed part of the machine every time, it will result in the adjacent ends of the rails to be welded making engagement sooner or later than the desired time of engagement, and therefore, more or less of the rail ends will have heated up and flashed away before the first limit switch is reached. This results in variable amounts of burn-off before the speed of the platen is increased and may result in poor welds, due either to insufficient heating up of the ends because the limit switch has been reached too soon, or in excessive burn-off of material because the limit switch has been reached later than the predetermined time after the ends have engaged.

The problem which is set forth above, could be avoided if it were possible to have the adjacent ends of the rails spaced apart the same amount each time, in other words, if the new rail being fed into the machine could have its leading end stopped always at a fixed distance from the rear end of the welded string, then this problem would not arise because the total distance traversed by the platen being constant, and the distance between adjacent rail ends being constant, there would be a constant amount of burn-off of the ends of the rail by the time the platen reached the limit switch. This is possible where the objects to be welded are light in weight and can be readily stopped in their progress by ordinary mechanical stops. In the case of heavy objects, however, such as rails, the great mass of the welded string, as well as the great mass of the incoming rail, is such that the momentum makes it impossible effectively to stop either of these members by ordinary mechanical stops. Therefore, the stopping points, both of the rear end of the welded string and the forward end of the new rail are indefinite, and the distance between these adjacent ends will vary, thus creating the problem set forth above.

The principal object of my invention, therefore, is to provide means which will insure burn-off of a constant amount of the adjacent rail ends before the first limit switch is encountered by the moving platen so that uniform welds will be obtained, regardless of the relative position of the adjacent rail ends before platen movement began. For this purpose, I provide means for controlling the actuation of the limit switches, and particularly of the first limit switch, not by the total movement of the platen, but rather by the effective movement of the platen from the time that the rail ends contact. Thus it will be seen that I have eliminated from the setting of the beginning of effective movement of the platen, the movement of the platen prior to the time that the rail ends contact, and thus I have eliminated the variable which has heretofore been present owing to the variable distances by which the rail ends were separated when the platen movement began.

Further objects and advantages of this invention will become apparent in the following detailed description thereof.

In the accompanying drawing, the single figure is a plan view, partly diagrammatic, of one form of my invention.

Referring to the drawing, I have shown the principal elements of a rail welding machine to which my invention is applied. While the invention is described in connection with a machine for welding rails, it will be understood that the invention has general application to the welding of other heavy objects whose movement creates large momentum forces making it difficult to employ ordinary mechanical stops. The machine disclosed is a rail flash welding machine of the type disclosed in my joint patent with Charles B. Roeds, No. 2,250,869, granted July 29, 1941. This machine comprises the fixed portion 10 upon which is mounted a movable platen 11. The platen may be supported upon guide bars 12 on the fixed portion with which engage arms 13 carried by the platen. The platen is thus mounted for reciprocatory movement, and such movement may be effected in any manner, as, for instance, as disclosed in the said patent which includes a plunger 15 fixed to the platen, and adapted to be actuated by fluid pressure, such as hydraulic pressure, operating from a suitable source. The rail R may be the first rail which has been inserted in the machine, or it may be the last rail of a long string which has already been welded. In any case, the rear end 19 of the rail R is held upon the fixed base 10 of the machine by suitable clamps, such as side clamps (not shown), which hold the rail fixed laterally, and by top clamp 22 which is held in engagement with the tread portion 23 of the rail by suitable pressure means, such as the hydraulic pressure means shown in the said patent. Similarly, after the rail R' has been fed into the machine until its leading end 20 lies adjacent the rear end 19 of rail R, the said rail R' is clamped to the platen 11 by a clamp 22' similar to clamp 22 and similarly held down in engagement with the rail tread 23. Suitable side clamps (not shown) are also employed. When the rails have been clamped in position on the fixed base 10 and on the movable platen 11, respectively, current clamps 25 and 25' are applied to the respective rail ends for leading current into these rails from a transformer. The primary winding of the transformer is energized from a suitable source, and the secondary winding is connected by the leads 26 and 27 to the current clamps 25 and 25'.

The platen 11 is now fed forward at a predetermined rate. This rate is such that when the rail ends make contact and start heating up, flashing will take place and a certain portion of each of the adjacent rail ends burn off without sticking. It will be understood that this rate of movement of the platen must necessarily be a slow rate for, otherwise, the rail ends would stick, thus extinguishing the flash and making it necessary to separate the rail ends and then feed them together again. However, after the rail ends have heated up, and a certain amount of flashing has occurred, it is then desirable to feed the rails together at a faster rate because the arc will now sustain more rapid flashing. Therefore, as fully stated in the introduction hereto, it was heretofore the practice to cause the platen to trip a limit switch after it had traversed a predetermined distance, and this limit switch would control mechanism, such as that shown in the above mentioned patent, which would admit more fluid pressure behind the shaft 15 and thus increase the rate of speed of the platen. After the platen had traversed a predetermined distance at this increased rate of speed, it tripped another limit switch which caused still more fluid pressure to be applied behind the platen, and thus effect the push-up, which actually formed the weld by squeezing out the molten metal.

The problem which this invention seeks to solve becomes apparent from the above description of the practice heretofore employed. Referring to the drawing, let us assume that heretofore movement of the platen from dotted-line position A to dotted-line position C was the total movement of the platen until it tripped the first limit switch for the first increase in speed. Of the distance A to C, which the platen traversed until it met the limit switch, the distance A to B represented the separation of the rail ends, i. e., the distance which the platen traversed before the rail ends engaged and flashing began. Only the distance B to C represented the effective movement of the platen from the time the rail ends engaged, and therefore, represented the amount of burn-off of the rail ends before the speed of the platen was increased. If, instead of being separated the distance A—B, the rail ends were initially separated a lesser distance, then it will be seen that flashing would start earlier than in the case where the rail ends are initially separated A—B, and by the time the platen has traveled the distance A—C, more of the rail ends than B—C will have been burned off. As a result, when the push-up occurs, it will be found that more metal will be extruded than would be the case if the rail ends were separated the distance A—B. On the other hand, suppose the rail ends were initially separated more than the distance A—B. Then it will be seen that by the time the platen has traveled the distance A—C to the first limit switch, a lesser amount than B—C of the rail ends will have been burned off, and, as a result, when the final push-up occurs, there will be obtained a weld with less extrusion than in the other two cases described. Thus non-uniformity of welds will result, if the rails are not initially separated a constant distance, such, as, for instance, the distance A—B. In the introduction hereto, it has been fully explained why in the case of heavy objects such as rails moving continually through a welding machine, it is not possible either to stop the last rail with its end 19, or to stop the next rail with its adjacent end 20, in any fixed relative position, and it was explained why this distance between adjacent ends 19 and 20 will vary. Thus the problem of non-uniform welds arises.

In order that a uniform amount of burn-off of adjacent rail ends may be obtained, regardless of the initial separation of adjacent ends 19 and 20, I propose to operate the limit switch, not by the absolute movement of the platen from A to C, but rather by the movement of the platen after the rail ends have come into flashing engagement. Since the point of flashing engagement is constant, it offers a constant zero point from which to predetermine the amount of burn-off. Thus, if it is desired to effect increase in feeding rate of the platen 11 after an amount of burn-off equivalent to B—C has been effected, I cause the effective movement of the platen for the purpose of actuating the limit switch to begin when the rail ends contact, and to continue for the predetermined distance B—C. Thus I eliminate the variable initial distances between adjacent ends 19 and 20 from the determination of the amount of burn-off.

To accomplish the above purpose, I provide the following mechanism which is merely illustrative as one specific embodiment thereof, but any equivalent structure which will accomplish the fundamental step of causing the movement of the platen to become effective to actuate the limit switches only when flashing engagement takes place, is contemplated by this invention. In the form shown, the limit switch may comprise a rotatable disc 40 normally held in initial position with its stop 41 against a fixed stop 42 on the fixed member 10 by means of a spring 43. The disc 40 carries one element 45 of a pair of switch contacts, the other elements 46 and 47 being carried by the fixed member 10 at predetermined angular distances spaced from switch contact 45. It will thus be seen that if the disc 40 is rotated through a predetermined angular distance, contact 45 will engage contact 46 to operate the first increase of speed in any well known manner, and that after the disc 40 has rotated through a further predetermined angular distance, contact 45 will engage contact 47 to effect the next increase in speed, or push-up. By this invention, I cause the disc 40 to begin to rotate not when the platen 11 starts from its original position A, but rather when the rail ends 19 and 20 come into flashing engagement. For this purpose, I may connect in parallel with the transformer T, a relay 50. Normally, before the rail ends engage, the circuit is open and the voltage across these ends is high, and therefore a relatively high current passes through the relay coil 51. As soon, however, as the rail ends engage, there is a rush of current through the rail with a resultant drop of voltage through coil 51, causing an armature 52 to be released by means of spring 53, and breaking contact at 54. The contacts 54 are in the circuit of a coil 55 which coil normally attracts its armature 56 to unclutch a clutch 57 between shaft 61, carrying the disc 40, and shaft 62, carrying a pinion 58 which is adapted to be operated by a rack 59 carried by the platen 11. The de-energization of coil 55 permits a spring 60 to render the clutch 57 effective, and thus clutch shaft 61 to the shaft 62 of pinion 58. From this point on, movement of the platen 11 will rotate disc 40, but it will be seen that the rotation of disc 40 begins only when clutch 57 is rendered effective, which is the time when coil 55 is de-energized by reason of the dropping voltage through coil 51 caused by the flashing engagement of rail ends 19 and 20.

While I have disclosed my invention in connection with a machine wherein the various speeds are in each case increasing speeds, it will be apparent that the invention applies equally well to the control of decreasing speeds. In other words, it applies generally for the control of variable speed feeds.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a rail welding machine having a fixed part and a movable platen adapted, respectively, to support two members to be welded, means for moving the platen at a predetermined rate toward said fixed part to effect flashing engagement of said members, means for changing the speed of movement of said platen, means whereby said speed-changing means is rendered effective after a predetermined amount of effective movement of the platen and means whereby said effective movement is caused to commence when said members engage.

2. In a rail welding machine having a fixed part and a movable platen adapted, respectively, to support two members to be welded, the platen being adapted to move at a plurality of successively changing speeds as determined by a limit switch adapted to be operated by the platen in the course of its movement, said switch being adapted to be operated after the ends of said members have engaged and predetermined portions of said members have burned away, said machine characterized by means for insuring operation of said switch after constant portions of said members have burned away, regardless of the variations in distance between the adjacent ends of said members when the platen starts its movement, said means comprising means whereby the travel of said platen is normally ineffective to actuate said limit switch, and means whereby the engagement of said members renders said platen effective to actuate said switch.

3. In a rail welding machine having a fixed part and a movable platen adapted, respectively, to support two members to be welded, the platen being adapted to move at a plurality of successively changing speeds as determined by a limit switch adapted to be operated by the platen in the course of its movement, said switch being adapted to be operated after the ends of said members have engaged and predetermined portions of said members have been burned away, the method for insuring operation of said switch after constant portions of said members have burned away regardless of the variations in distance between the adjacent ends of said members when the platen starts its movement, which consists in setting the beginning of effective movement of the platen for the purpose of actuating said switch from the time the said members engage.

GEORGE LESTER JONES.